(12) United States Patent
Baden

(10) Patent No.: US 6,615,958 B1
(45) Date of Patent: Sep. 9, 2003

(54) INTEGRATED AIRCRAFT WHEEL, BRAKE AND AXLE FOR ALL-ELECTRIC AIRCRAFT BRAKING SYSTEM

(75) Inventor: Bradley J. Baden, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 09/660,282

(22) Filed: Sep. 12, 2000

Related U.S. Application Data

(60) Provisional application No. 60/153,591, filed on Sep. 13, 1999.

(51) Int. Cl.[7] ............................................. F16F 55/40
(52) U.S. Cl. .............................. 188/264 AA; 188/71.2
(58) Field of Search ........................ 301/137; 188/264 A, 188/264 AA, 71.5

(56) References Cited

U.S. PATENT DOCUMENTS

| | | | | |
|---|---|---|---|---|
| 2,299,484 A | * | 10/1942 | McLune ................... 188/71.5 |
| 3,003,590 A | * | 10/1961 | Ash ....................... 188/264 AA |
| 4,135,764 A | * | 1/1979 | Johnson et al. ........ 188/264 AA |
| 4,432,440 A | * | 2/1984 | Crossman ................. 188/71.2 |
| 5,190,247 A | * | 3/1993 | Le Chatelier ......... 188/264 AA |
| 5,215,168 A | * | 6/1993 | Guiot et al. ............. 188/264 A |
| 6,017,097 A | * | 1/2000 | Weir, III .................... 301/137 |

FOREIGN PATENT DOCUMENTS

GB         1371336    * 10/1974      ........... 188/264 AA

* cited by examiner

Primary Examiner—Matthew C. Graham
(74) Attorney, Agent, or Firm—Renner, Otto, Boisselle & Sklar, LLP

(57) ABSTRACT

An integrated wheel, brake and axle structure for an aircraft comprises a tubular axle, and a wheel hub rotatably mounted interiorly of the tubular axle and accessible at an axial end thereof for mounting of a wheel thereto. A brake disk stack, having front and rear axial ends, includes alternating rotor and stator disks mounted with respect to the wheel support and wheel for relative axial movement. Each rotor disk is coupled to the wheel for rotation therewith and each stator disk is coupled to the axle for support against rotation. In such arrangement, the wheel web functions as a back pressure member for applying force to the outboard end of the disk stack. A cooling fan is provided interior of the axle for generating a cooling flow of air across the brake disk stack.

23 Claims, 1 Drawing Sheet

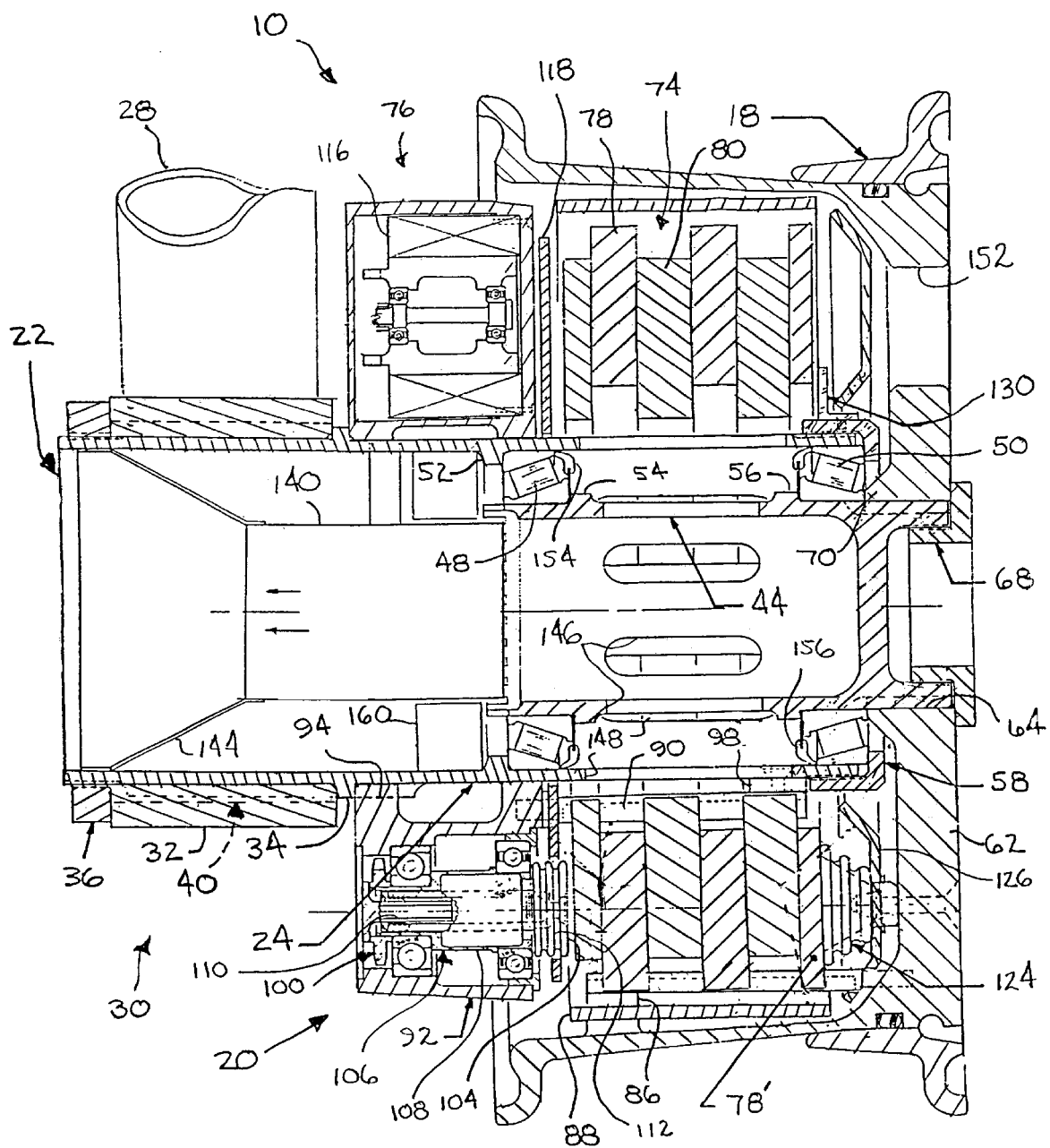

INTEGRATED AIRCRAFT WHEEL, BRAKE AND AXLE FOR ALL-ELECTRIC AIRCRAFT BRAKING SYSTEM

This application claims benefit of Ser. No. 60/153,591, filed Sep. 13, 1999.

FIELD OF THE INVENTION

The invention herein described relates generally to aircraft landing gear and, more particularly, to an integrated wheel, brake and axle that is particularly adapted for an all-electric aircraft braking system.

BACKGROUND OF THE INVENTION

Known in the prior art are aircraft wheel and brake assemblies including a non-rotatable wheel support, a wheel mounted to the wheel support for rotation, and a brake disk stack having front and rear axial ends and alternating rotor and stator disks mounted with respect to the wheel support and wheel for relative axial movement. Each rotor disk is coupled to the wheel for rotation therewith and each stator disk is coupled to the wheel support against rotation. A back plate is located at the rear end of the disk pack and a brake head is located at the front end. The brake head houses a plurality of actuator rams that extend to compress the brake disk stack against the back plate. Torque is taken out by the stator disks through a static torque tube or the like.

Electrically actuated aircraft brakes of various configurations are known, as exemplified by U.S. Pat. Nos. 4,381,049, 4,432,440, 4,542,809 and 4,567,967. The brake assemblies shown in these patents include electric motors which respond to an electrical control signal to effect rotation of a ring gear member which interacts through a plurality of balls to drive a linearly movable ram member into-contacting engagement with a brake disk stack to effect compression thereof and braking of a wheel.

In U.S. Pat. No. 4,596,316, another configuration of an electrically actuated brake uses a roller screw drive wherein a ring gear member interacts through a plurality of roller screws to drive a ram member into engagement with the brake pressure plate to effect compression of the brake disk stack for braking action. A plurality of electric motors and their associated pinions drive a ring gear into rotation and the plurality of roller screws effect linear axial movement of the ram member.

In U.S. Pat. No. 4,865,162, a further electrically actuated aircraft brake employs a roller screw drive mechanism driven by an electric torque motor through a gear drive associated with either the screw or the nut of the roller screw drive mechanism. Rotation of the gear drive by the torque motor moves the other one of the screw or nut into axial engagement with a brake disk stack to compress the stack for braking. A plurality of the roller screw drive mechanisms and respective gear drives and torque motors are mounted in a balanced arrangement about the axis of the wheel to apply and release a brake pressure force on the brake disk stack in response to an electrical control signal to the torque motors.

One advantage of an all-electric braking system is the elimination of the need for hydraulic fluid, and the associated fluid lines, pumps, etc. However, most attempts today at designing an all-electric braking system have been to fit the electric braking components into a conventional hydraulic braking system design structure, including for example a torque tube and/or torque plate back leg. The problem to be solved is the design of an all-electric braking system that provides performance equal if not superior to existing systems (more robust and dynamically stable structure, more effective cooling, improved torque transfer, improved controllability, better predictability and dynamic response, etc.) while at the same time reducing the overall weight and/or package size of the braking system, number of parts.

SUMMARY OF THE INVENTION

The present invention approaches the design of an all-electric braking system in a radically different manner, with attendant advantages over prior braking systems. This is accomplished by integrating the wheel, brake and axle structures, as opposed to such components being treated as separate design components. Moreover, it has been discovered that features of the invention, while originally conceived in the context of providing a superior all-electric braking system, have application to a hydraulic braking system as well.

According to one aspect of the invention, a wheel and brake assembly comprise a tubular axle, and a wheel hub rotatably mounted interiorly of the tubular axle and accessible at an axial end thereof for mounting of a wheel thereto. A wheel having a web and an outer peripheral rim can be telescopically mounted on an end of the wheel hub at a center hole in the web.

In one embodiment, the wheel hub is mounted for rotation by axially spaced apart inboard and outboard bearings. The inboard bearing is captured between axially opposed stepped shoulders on the axle and wheel hub, and the outboard bearing is captured between axially opposed stepped shoulder on the wheel hub and an axle retainer removably secured to the axle. The wheel web may have a tubular projection bearing against an outer race of the outboard bearing.

In an embodiment, a fan is located interiorly of the axle and coupled to the wheel hub for rotation therewith. The wheel hub and axle may have openings therein for passage of air into the interior of the wheel hub. The fan preferably has an exhaust outlet opening to the inboard end of the axle, and a preferred type of fan is an axial vane fan. The fan may be located in a cowling have a reduced diameter portion defining with an interior surface of the axle a protected region for housing a sensor.

In an embodiment, a brake disk stack, having front and rear axial ends, includes alternating rotor and stator disks mounted with respect to the wheel support and wheel for relative axial movement. Each rotor disk is coupled to the wheel for rotation therewith and each stator disk is coupled to the axle for support against rotation. In a preferred arrangement, the wheel web functions as a back pressure member for applying force to the outboard end of the disk stack. The wheel web may have mounted thereon a plurality of disk engaging members, preferably in the form of finned cones.

Further in accordance with the invention, the wheel and brake assembly comprises an actuator assembly supported on the wheel support inboard of the brake disk stack. The actuator assembly may be telescopically mounted on the axle. A preferred actuator assembly includes a housing, with the stator disks coupled to the actuator housing by at least one spline bar coupled to the actuator housing, and the rotor disks coupled to the wheel hub by at least one spline bar coupled at one end to the wheel hub.

In an embodiment, the actuator assembly includes a plurality of actuator modules independently removably mounted to the wheel support, and the actuator modules preferably are electromechanical actuators.

In an embodiment, the actuator modules are mounted to a common support housing telescoped over the axle, and the axle and support housing have at least one interengaged spline and groove The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

BRIEF DESCRIPTION OF THE DRAWING

The sole FIGURE is schematic cross-sectional view of an integrated wheel, brake and axle assembly according to the invention.

DETAILED DESCRIPTION OF THE INVENTION

Referring now in detail to the drawing, an exemplary integrated wheel, brake and axle assembly according to the invention is designated generally by reference numeral 10. Because the invention was conceived and developed for use in an aircraft braking system, it will be herein described chiefly in this context. However, the principles of the invention in their broader aspects can be adapted to other types of systems including, for example, hydraulic systems wherein hydraulic actuators are used and controlled either hydraulically or electrically.

The integrated wheel, brake and axle assembly 10 generally comprises a wheel 18, a brake assembly 20 and an axle assembly 22.

The axle assembly 22 includes a tubular axle 24, which in the illustrated embodiment also functions as a torque tube, as will be seen from the following description. The axle 24 is mounted at its inboard end to a strut 28 of an aircraft landing gear 30 (the upper portion of the landing gear is not shown and may be of a known construction). In the illustrated embodiment, the inboard end of the axle 24 is received in a tubular mounting collar 32 provided at the lower end of the strut 28. Axial positioning and securement axle is effected by an abutment 34 on the axle and a fastening device 36. The abutment 34 preferably is formed by an annular flange or shoulder on the axle and the fastening device 36 preferably is a retaining nut threaded on the innermost threaded end of the axle which projects inwardly beyond the axially inner end of the mounting collar 32. Any suitable anti-rotation device may be provided to prevent rotation of the axle relative to the mounting collar. In the illustrated embodiment, the axle and mounting collar have cooperating splines and grooves which are indicated generally at 40.

The axle assembly 22 further includes a wheel hub 44. The wheel hub 44 is mounted for rotation interiorly of the outboard end portion of the axle 24 by a pair of axially spaced apart bearings 48 and 50, which may be tapered roller bearings as illustrated. The inboard bearing 48 is axially captured between a radially inner abutment 52 on the axle 24 and a radially outer abutment 54 on the wheel hub. The outboard bearing 50 is axially captured between a radially outer abutment 56 on the wheel hub and a suitable retainer 58. A preferred retainer is the illustrated axle nut which is threaded on the outboard end of the axle 24 and which has a radially inwardly extending flange which abuts against the axially outer end of the outboard bearing to retain the bearing in place, as well as the wheel hub 44. The inner and outer abutments preferably are annular flanges or shoulders on the respective axle and wheel hub. As will be appreciated, the illustrated arrangement lends itself to each and quick telescopic assembly and disassembly of the wheel hub with respect to the axle. Moreover, it will be appreciated that the bearing preload applied by tightening the axle nut will not be disturbed by wheel removal.

The wheel hub 44 projects axially outwardly beyond the axle 24 for mounting of the wheel 18 thereon. The web 62 of the wheel has a central aperture 64 for telescopically receiving the projecting end of the wheel hub and the wheel is held on the wheel hub by a suitable retainer such as the illustrated wheel nut 68. The wheel nut 68 has a tubular shank that is externally threaded for screwing into the internally threaded end of the wheel hub. An radially outwardly extending flange (or head) of the nut axially abuts the web of the wheel to hold it to the wheel hub. The wheel web may have an axially inwardly protruding collar 70 that may extend through the center of the axle nut 58 and bear axially against the radially inner race of the outboard bearing 50, as shown.

As preferred, the wheel is of the locking type with the radially outer tire mounting portion thereof disposed mostly inboard of the wheel web 62 for defining an interior space accommodating a major portion of the brake assembly 20.

The brake assembly 20 includes a brake disk stack 74 and an actuator assembly 76. The brake disk stack 74 includes alternating rotor disks 78 and stator disks 80 mounted with respect to the axle 24 for relative axial movement. Each rotor disk 78 is coupled to the wheel for rotation therewith and each stator disk 82 is coupled to the axle 24 against rotation.

More particularly, the rotor disks are coupled to the wheel for common rotation by one and preferably a plurality of axially extending, rotor torque bars 84 which are received in respective radially outwardly disposed notches in the rotor disks. The rotor torque bars 84 are secured at their outboard ends to the web 62 of the wheel 18. The rotor torque bars may have the ends thereof press fitted in holes in the wheel web or otherwise suitably secured. As needed, a plurality of circumferentially spaced apart supports 86 may be provided on the wheel to support the inboard ends of the rotor torque bars. The supports 86 may also serve as a convenient means for mounting a tubular heat shield 88 that radially outwardly surrounds the brake disk stack 74.

In a somewhat similar manner, the stator disks 80 are coupled to the axle 24 against relative rotation by one and preferably a plurality of axially extending, stator torque bars 90 which are received in respective radially inwardly disposed notches in the stator disks 80. The stator torque bars 90 are secured at their inboard ends to the housing 92 of the actuator assembly 76. The actuator housing 92 is mounted on the axle 24 and suitably secured against relative rotation, as by means of cooperating splines and grooves 94 on the actuator housing and axle. The stator torque bars may have the ends thereof press fitted in holes in the actuator housing or otherwise suitably secured. As needed, a plurality of circumferentially spaced apart supports 98 may be provided on the axle to support the outboard ends of the stator torque bars.

In addition to the housing 92, the actuator assembly 76 includes at least one and preferably a plurality of actuators 100. The actuators are preferably electromechanical actuators, such as the type described, for example, in International Patent Application No. PCT/US98/02764. It will however be appreciated that features of the present invention may also be used with hydraulic actuators.

Each brake actuator 100 includes a reciprocating output ram 104 which may be extended and retracted by means of an electric motor via an associated gear train and a rotary to linear motion converter 106 such as a screw and nut, ball screw, etc. In the drawing, a rotating nut 108 effects extension and retraction of a screw 110 to extend and retract the ram. The projecting end of the ram is enclosed by a metal bellows 112 to prevent foreign material from entering the screw mechanism. The motor for the illustrated ram cannot be seen in the drawing; however, the motor 116 for another one of the actuators 100 can be seen at the top in the drawing figure. A heat shield 118 is preferably provided between the actuator assembly and the brake disk stack, with apertures being provided for the rams 104.

As will be appreciated, extension of the ram 104 of each actuator 100 will axially compress the brake disk stack 74 against the web 62 of the wheel 18. The reactionary force is developed when the outermost rotor disk 78' is urged against a plurality of circumferentially spaced apart pucks 124 mounted to the wheel web 62. As a result the outermost rotor disk 78' functions much like a back plate. The pucks may be in the form of cones that are finned for more efficient cooling, so as to minimize the amount of heat flowing from the disk stack to the wheel web. Preferably, a heat shield 126 is provided between the disk stack and the wheel web, with apertures therein accommodating the connection of the pucks to the wheel web.

As is the case for the wheel hub 44, the brake assembly can be easily assembled on or removed from the axle 24. For assembly, the actuator assembly 76 can be assembled as a unit on the axle by telescopically slipping the same onto the axle and against the abutment 34 which functions to properly position the actuator assembly. The heat shield 118, as well as the stator torque bars 90, may be carried on the actuator assembly for easy assembly. After the actuator assembly has been installed, the rotor disks 80 and stator disks 78 may be alternately slipped onto the stator torque bars 90. Before the wheel is mounted to the wheel hub 44, preferably a brake disk retainer bracket 130 is attached to the axle nut 58 to retain the disks in place when the wheel is removed from the wheel hub. Then, the wheel may be mounted to the wheel hub as abovedescribed.

The foregoing arrangement also lends itself to more efficient and active cooling of the brake assembly. To this end, the wheel hub has connected thereto or integrated therein a cooling fan 140, such as an axial vane fan. The outlet of the fan 140 is formed by an outwardly flared cowling 144 opening to the inboard end of the axle 24 for exhausting of hot air inwardly of the overall wheel, brake and axle structure. The inlet of the fan 140 is coupled to the interior of the wheel hub 44 which is provided with one and preferably a plurality of openings 146 intermediate the bearings 48 and 50. As shown the openings 146 may be circumferentially spaced apart, axially extending slots. Communicating with the slots 146 are openings 148 in the axle 24 in the region between the bearings 48 and 50. The openings 148 may be circumferentially spaced apart, axially extending slots. The axle slots 148 open to the interior of the brake disk stack 74.

During braking of the moving aircraft, wheel rotation will cause the fan to draw air across the brake disk stack and remove the heated air via the openings in the axle and the wheel hub for exhausting out through the cowling. It is also desirable to have cooling air drawn over the finned cones 124. To this end, the wheel web 62 is provided with openings 152 for passage of air around the finned cones and past the brake disks for exhausting in the previously mentioned manner. To ensure maximum air flow over the brake disk stack, preferably inboard and outboard seals 154 and 156 are provided to block air from being drawn into the wheel hub form the gaps between the axle and wheel hub outwardly of the extent of the openings 146 and 148.

It also is noted that the annular space between the cooling fan 140 and interior wall surface of the axle 24 provides a convenient and protected location for mounting a wheel speed sensor 160 used for brake control purposes, or otherwise.

As should now be evident from the foregoing description, the illustrated integrated wheel, brake and axle assembly eliminates the need for a torque tube with consequent weight and part reduction benefits. Brake actuation load reaction to be taken out through the wheel web and through the wheel axle, which in essence performs the function of the eliminated torque tube. The illustrated assembly is also characterized by an inside-out wheel hub which enables wheel removal without disturbing wheel bearing preload. Such arrangement also affords a protected location for a wheel speed transducer. The illustrated arrangement also provides an axle mounted, vane-axial cooling fan affording high reliability and efficient cooling. Overall, such arrangement is easy to assemble/disassemble for reduced turnaround time, and overall provides for significant weight and part reduction relative to known wheel, brake and axle assemblies.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

In addition, the invention is considered to reside in all workable combinations of features herein disclosed, whether initially claimed in combination or not and whether or not disclosed in the same embodiment.

What is claimed is:

1. A wheel and brake assembly comprising a tubular axle, a wheel having a web and an outer peripheral rim, a wheel hub rotatably mounted interiorly of the tubular axle and accessible at an axial end thereof for mounting of the wheel thereto, and a brake disk stack having front and rear axial ends and including alternating rotor and stator disks mounted with respect to the axle and wheel for relative axial movement, each rotor disk being coupled to the wheel for rotation therewith and each stator disk being coupled to the axle for support against rotation, and wherein the wheel web has mounted thereto a plurality of disk engaging members providing for the transfer of force from the brake disk stack to the wheel web whereby the wheel web functions as a back pressure member for applying force to the outboard end of the disk stack.

2. A wheel and brake assembly as set forth in claim 1, wherein the web includes a center hole for telescopic mounting on an end of the wheel hub.

3. A wheel and brake assembly as set forth in claim 2, wherein the wheel hub is mounted for rotation by axially spaced apart inboard and outboard bearings, the inboard bearing being captured between axially opposed stepped shoulders on the axle and wheel hub, and the outboard bearing being captured between axially opposed stepped shoulder on the wheel hub and an axle retainer removably secured to the axle.

4. A wheel and brake assembly as set forth in claim 3, wherein the wheel web has a tubular projection bearing against an outer race of the outboard bearing.

5. A wheel and brake assembly as set forth in claim 1, comprising an actuator assembly supported on the axle inboard of the brake disk stack.

6. A wheel and brake assembly as set forth in claim 5, wherein the actuator assembly is telescopically mounted on the axle.

7. A wheel and brake assembly as set forth in claim 5, wherein the actuator assembly includes a housing, the stator disks are coupled to the actuator housing by at least one spline bar coupled to the actuator housing, and the rotor disks are coupled to the wheel hub by at least one spline bar coupled at one end to the wheel hub.

8. A wheel and brake assembly as set forth in claim 5, wherein the actuator assembly includes a plurality of actuator modules independently removably mounted to the axle.

9. A wheel and brake assembly as set forth in claim 8, wherein the actuator modules are electro-mechanical actuators.

10. A wheel and brake assembly as set forth in claim 8, wherein the actuator modules are mounted to a common support housing telescoped over the axle.

11. A wheel and brake assembly as set forth in claim 10, wherein the axle and support housing have at least one interengaged spline and groove.

12. A wheel and brake assembly comprising a tubular axle, a wheel hub rotatably mounted interiorly of the tubular axle and accessible at an axial end thereof for mounting of a wheel thereto, and a fan located interiorly of the axle and coupled to the wheel hub for rotation therewith.

13. A wheel and brake assembly as set forth in claim 12, wherein the wheel hub and axle have openings therein for passage of air into the interior of the wheel hub.

14. A wheel and brake assembly as set forth in claim 13, wherein the fan has an exhaust outlet opening to the inboard end of the axle.

15. A wheel and brake assembly as set forth in claim 12, wherein the fan is an axial vane fan.

16. A wheel and brake assembly as set forth in claim 12, wherein the fan is located in a cowling have a reduced diameter portion defining with an interior surface of the axle a protected region for housing a sensor.

17. A wheel and brake assembly as set forth in claim 12, comprising a brake disk stack having front and rear axial ends and including alternating rotor and stator disks mounted with respect to the axle and wheel for relative axial movement, each rotor disk being coupled to the wheel for rotation therewith and each stator disk being coupled to the axle for support against rotation.

18. A wheel and brake assembly as set forth in claim 17, wherein the wheel web functions as a back pressure member for applying force to the outboard end of the disk stack.

19. A wheel and brake assembly as set forth in claim 18, wherein the wheel web has mounted thereto a plurality of disk engaging members.

20. A wheel and brake assembly comprising a tubular axle, a wheel hub rotatably mounted interiorly of the tubular axle and accessible at an axial end thereof for mounting of a wheel thereto, and a brake disk stack having front and rear axial ends and including alternating rotor and stator disks mounted with respect to the axle and wheel for relative axial movement, each rotor disk being coupled to the wheel for rotation therewith and each stator disk being coupled to the axle for support against rotation, wherein the wheel web functions as a back pressure member for applying force to the outboard end of the disk stack, wherein the wheel web has mounted thereto a plurality of disk engaging members, and wherein the disk engaging members are finned cones.

21. A wheel and brake assembly comprising a tubular axle, a wheel hub rotatably mounted interiorly of the tubular axle and accessible at an axial end thereof for mounting of a wheel thereto, and a brake disk stack having front and rear axial ends and including alternating rotor and stator disks mounted with respect to the axle and wheel for relative axial movement, each rotor disk being coupled to the wheel for rotation therewith and each stator disk being coupled to the axle for support against rotation; and a fan located interiorly of the axle, and the wheel hub and axle have openings in the region thereof surrounded by the brake disk stack for drawing cooling air across the brake disk stack and into the interior of the wheel hub.

22. A wheel and brake assembly comprising a tubular axle, a wheel hub rotatably mounted interiorly of the tubular axle and accessible at an axial end thereof for mounting of a wheel thereto, and an actuator assembly supported on the axle inboard of the brake disk stack, the actuator assembly including a housing encircling and slidably telescopically supported on the tubular axle.

23. A wheel and brake assembly comprising:

a tubular axle;

a wheel hub rotatably mounted interiorly of the tubular axle and accessible at an axial end thereof for mounting of a wheel thereto;

a brake disk stack having front and rear axial ends and including alternating rotor and stator disks mounted with respect to the axle and wheel for relative axial movement, each rotor disk being coupled to the wheel for rotation therewith and each stator disk being coupled to the axle for support against rotation; and a cooling fan housed within the tubular axle.

* * * * *